Sept. 16, 1958 F. KESSLER 2,852,626

LINE TESTING CIRCUIT

Filed June 18, 1956 3 Sheets-Sheet 1

INVENTOR.
FRANK KESSLER

BY J. Warren Whitesel

ATTORNEY

United States Patent Office 2,852,626

Patented Sept. 16, 1958

2,852,626

LINE TESTING CIRCUIT

Frank Kessler, Los Angeles, Calif., assignor to General Dynamics Corporation, Rochester, N. Y., a corporation of Delaware

Application June 18, 1956, Serial No. 592,018

10 Claims. (Cl. 179—175.2)

This invention relates to telephone systems and more particularly to means for testing subscriber lines.

Telephone systems may include a plurality of subscriber lines which are subject to many faults such as: leakage, undesired and foreign battery or ground connections, shorts or the like. It may be desirable to conduct tests to determine whether these or any other insulation faults exist. Further, it may be desirable to conduct these tests under the supervision of a person located at a substation, as when subscriber lines are being installed, for example. In the past the routine has been to call a person in a telephone office, such as a wire chief, for example, and to request him to test the line over which the call is being made. That person makes suitable tests and then reports the outcome of these tests to a person at the subscriber station end of the tested line. There would be a saving of time if persons at subscriber stations could perform unaided tests upon lines leading to those subscriber stations thereby eliminating the need for calling upon a wire chief or other person for assistance.

An object of my invention is to provide a new and improved line testing circuit.

Another object of this invention is to provide means for testing subscriber lines from subscriber stations associated with those lines.

Yet another object of this invention is to provide means for enabling subscribers to test their own lines.

Briefly, I accomplish the above cited and other objects by providing centrally located line testing circuits that are accessible from a standard telephone system. Testing may be performed under the control of a subscriber hookswitch and dial which control line testing means to determine whether there are any faults on the line. A number of tone pulses are returned to indicate the outcome of the test.

It is thought that these and other objects will be obvious from a description of the attached drawings in which:

Fig. 1 shows, by means of a block diagram, a telephone system including a subscriber line adapted to use the invention, and typical faults which may occur on the line;

Figs. 2–4, when properly joined, show details of the test equipment; and,

Fig. 5 shows the manner in which Figs. 2–4 should be joined to provide a complete and understandable circuit.

I have tried to use simple and specific terms where possible to facilitate an understanding of the invention; however, I want it understood that the use of these simple and specific terms is not to act in any manner as a disclaimer of the full range of equivalents which is normally given under established rules of patent law. To illustrate, hereinafter, I refer in the specification to the source of office potential by means of the terms "ground (+)" and "(−) battery." As is the case in most telephone circuits, the plus (+) or positive terminal is described as being connected to ground. It should be understood that this or any other suitable power supply may be used. Also, it is noted that Fig. 1 shows telephone system 101 by a single rectangle to indicate that any siutable manual or switching system may be used to complete calls to test equipment 109. Obviously, many other examples could be given to illustrate the manner in which the invention is broader than the specific items that are shown.

*Brief description*

Test equipment 109 is adapted to perform various tests on the line leading to station A after which suitable signals are returned to indicate the results of each of the tests. After seizure, the person at station A transmits a distinctive pulse which initiates testing. While this distinctive pulse may be provided by many different means, it is convenient to transmit the distinctive pulse by opening the loop at the hookswitch contacts. One form which the open loop pulse may take could include a pulse which is longer than a standard dial pulse but shorter than an on-hook signal which would release test equipment 109. To facilitate such operation, I provide a release delay relay 240 which has an extra long delay period. For example, relay 240 may be adapted to hold operated due to its slow release characteristics for a long period of time such as 400–500 milliseconds. A distinctive pulse might be about half of that time, or for convenience of expression, 250 milliseconds. It should be expressly understood, however, that the use hereinafter of the expression "250 millisecond pulse" is not intended to limit my disclosure to that specific figure, but is intended to convey the meaning intended, i. e., a distinctive pulse which is neither a dial pulse nor an on-hook signal. In a similar manner, it should be obvious that once arbitrary figures, such as 250 milliseconds, are selected, other figures tend to become fixed also. For example, I have occasion to refer to 500 milliseconds and other periods. These references are made solely for economy of words because they explain one embodiment which my invention may take. Even within that embodiment, I expect to have a reasonable range of equivalents and not to be limited to exactly the time period noted.

Briefly, when test equipment 109 is seized, relays 230, 240, 320 and 330, among others, are initially operated and capacitors C23, C24 and C25 are charged. When the circuit to step relay 320 is thereafter broken, a discharging current from capacitor C25 holds step relay 320 for a predetermined time interval during which a leakage test is made. After capacitor C25 discharges sufficiently, step relay 320 releases and opens contacts 327 to break the circuit over which tone relay 330 operated; however, a discharging current from capacitor C24 holds tone relay 330 in an operated condition for another predetermined time interval during which a first pulse of tone is transmitted to the calling station from tone coil RC21. Finally capacitor C24 is discharged sufficiently and tone relay 330 releases to open contacts 331 for terminating tone and to close contacts 337 for recharging capacitor C25 and for reoperating step relay 320 over a circuit including contacts 414—assuming that there is no leakage fault. Step relay 320 reoperates, prepares for a ground test and closes contacts 327 for reoperating tone relay 330 and recharging capacitor C24. Tone relay 330 operates and opens contacts 337 to cause step relay 320 to release after the discharge time of capacitor C25. During this release time a ground test is made following which a second pulse of tone is sent for the period required for tone relay 330 to release as marked by the discharge time of capacitor C24. If there is no fault, step relay 320 and tone relay 330 continue to operate and release each other to conduct a battery test and a test end operation, thus transmitting two more pulses of tone. The person at station A hears four pulses of tone and knows that his line is in a non-faulty condition.

If a fault is encountered during the test cycle, means is provided to hold contacts 414 open so that step relay 320 does not reoperate when tone relay 330 closes contacts 337. Contacts 334 open each time that tone relay 330 releases; however, the charge on capacitor C23 prevents test hold relay 230 from releasing during the period normally required for step and tone relays 320 and 330 to reoperate. But, when a fault is encountered, step relay 320 does not reoperate as explained above. Contacts 327 do not close to reoperate tone relay 330 and thus contacts 334 stand open while capacitor C23 discharges. Then, test hold relay 230 releases to open contacts 236 and remove master ground so that the test is terminated. The person at station A counts the pulses of tone so that he knows which test was performed last, hence, what the fault is. For example, one pulse of tone indicates an insulation fault; two pulses of tone indicate a ground fault; and three pulses of tone indicate a battery fault.

*Detailed description*

Figures 1, 2, 5:
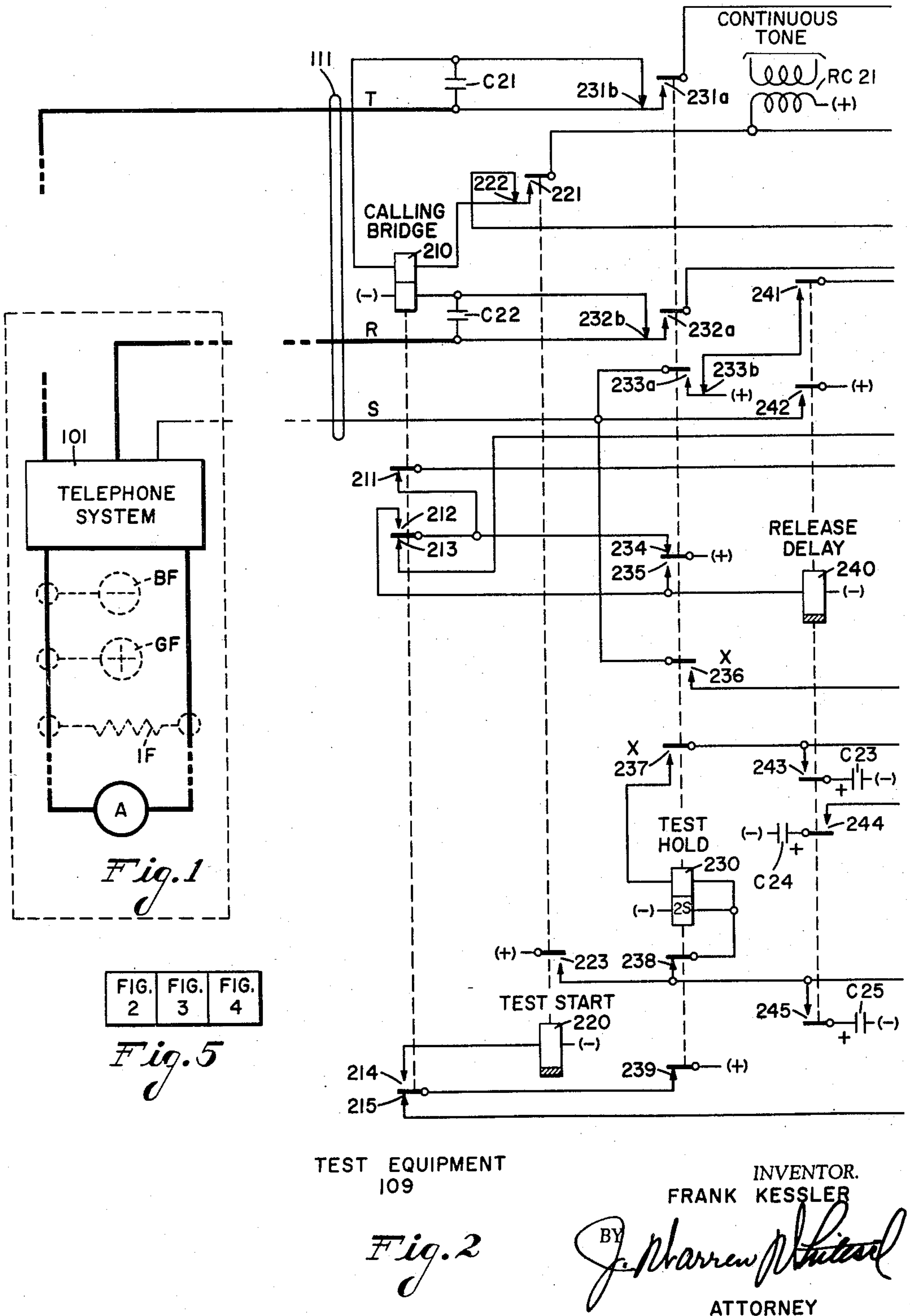
Figure 3:
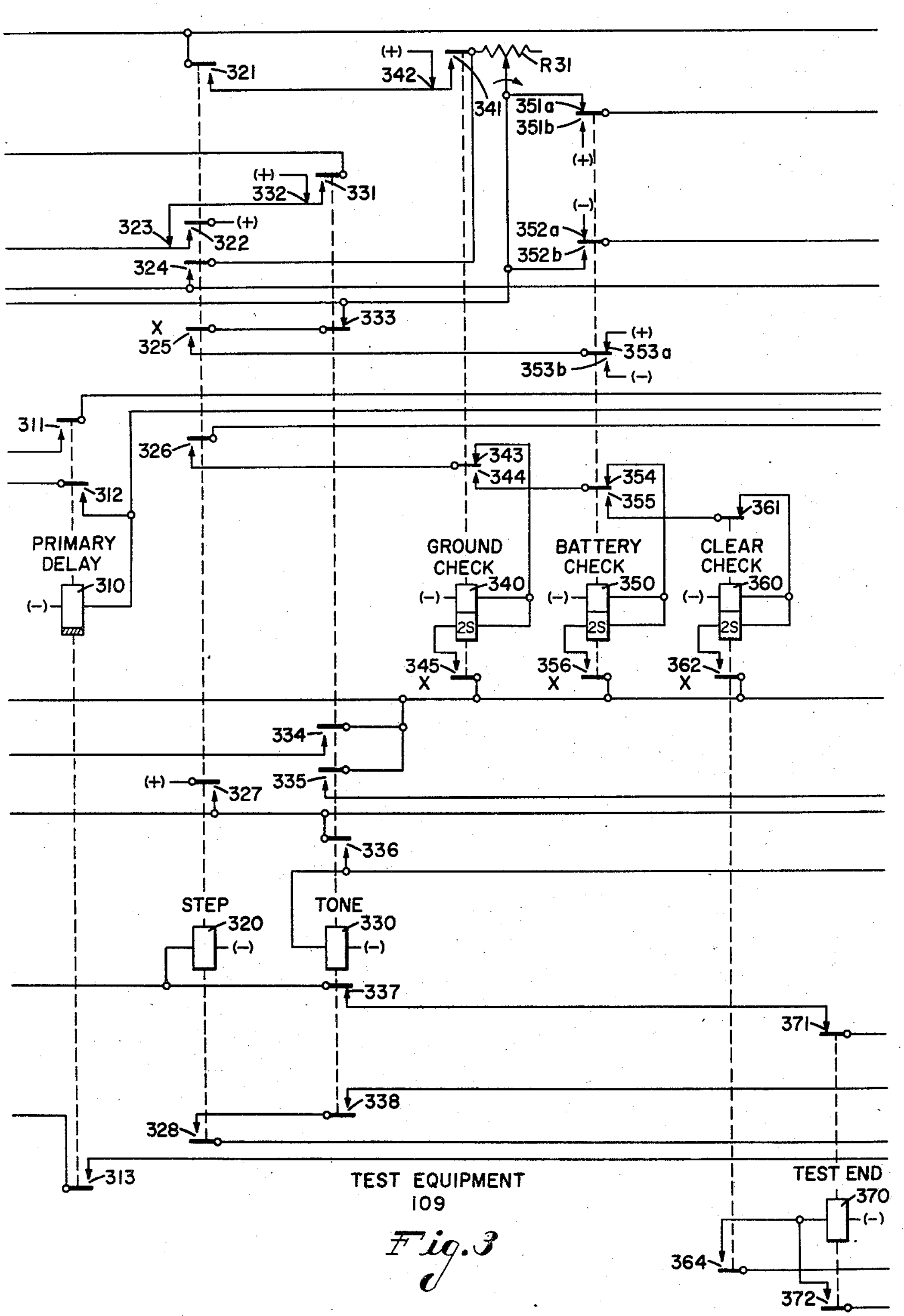
Figure 4:
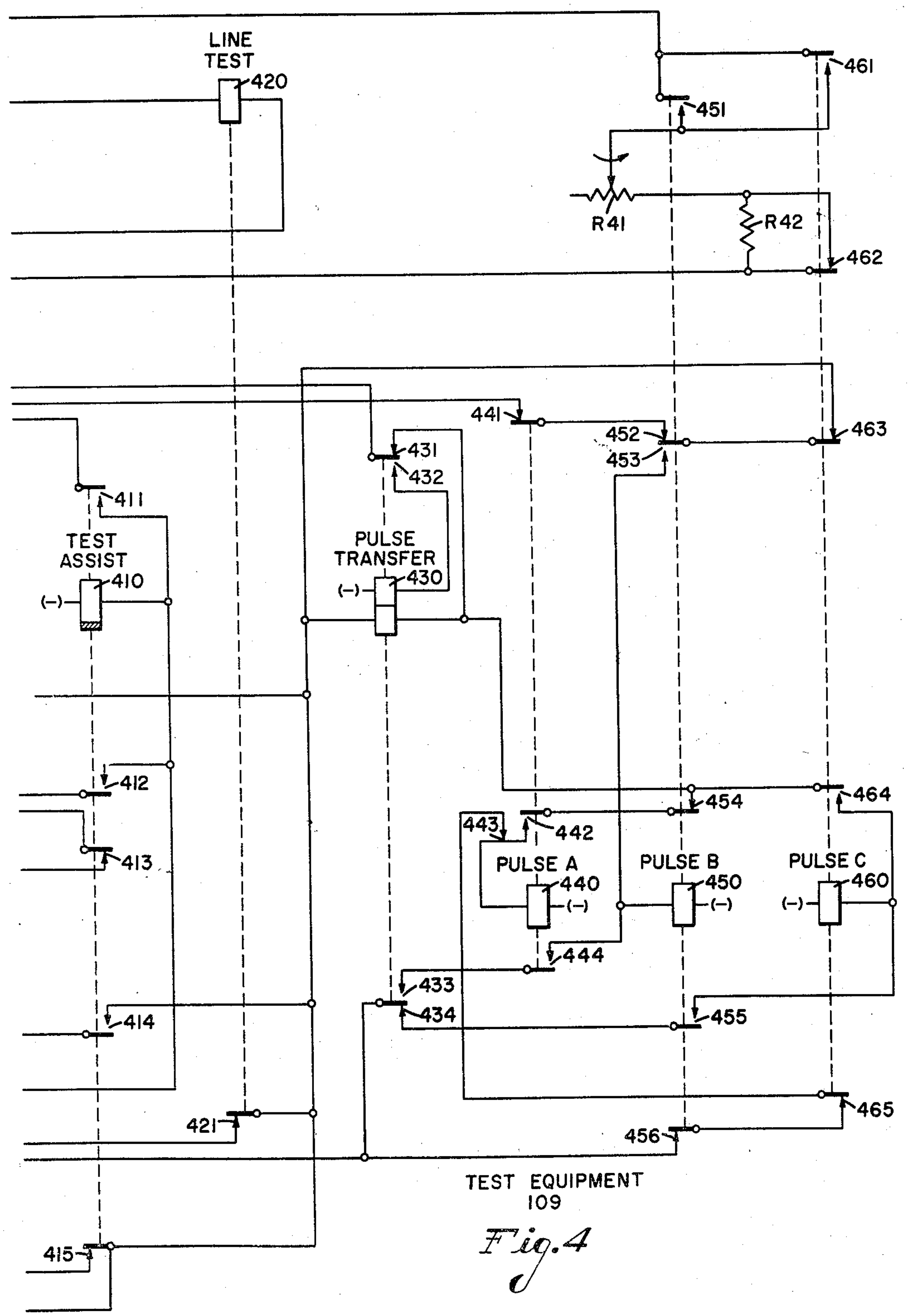

Next, there is a detailed description of Figs. 2–4. The three possible line faults IF, BF and GF (that are shown by means of dotted lines on Fig. 1) are not normally present on the line; therefore it is assumed that these faults do not exist except where specifically mentioned in the following description.

It is assumed that a call has been extended by any suitable means, such as telephone system 101, from telephone A to conductors T, R and S.

*Seizure.*—When preceding means seizes test equipment 109, a loop is completed across conductors T and R to operate calling bridge relay 210 over the circuit which may be traced from ground (+) through normally closed contacts 332, 323 and 222, the upper winding of calling bridge relay 210, normally closed contacts **231*b*, tip conductor T, the loop extending through telephone system 101, subscriber station A, ring conductor R, normally closed contacts 232*b*, and the lower winding of calling bridge relay 210 to (−) battery. Calling bridge relay 210 operates test start relay 220 by closing a circuit which extends from ground (+) through normally closed contacts 239, operated contacts 214, and the winding of test start relay 220 to (−) battery. Also responsive to the operation of calling bridge relay 210, release delay relay 240 operates over a circuit extending from (−) battery through the winding of release delay relay 240, contacts 212 and 234** to ground (+).

When release delay relay 240 operates responsive to the energization of calling bridge relay 210, contacts 242 are closed for applying a busy and holding ground to sleeve conductor S, and for supplying master ground to test equipment 109. Contacts 241 close to operate line test relay 420 over the circuit extending from ground (+) through contacts **233*b*, 241 and 351*a*, the winding of line test relay 420 and contacts 352*a* to (−) battery. Line test relay 420 has no function until later during the various tests, as explained below. Also responsive to the operation of release delay relay 240, contacts 243, 244 and 245** close to charge certain capacitors for controlling slow release relays as will be explained later in this description.

Means is provided for informing the person who is placing the call from station A of the fact that tests may be initiated. This information is extended in the form of a tone which is transmitted, responsive to the operation of relay 220, over the circuit that may be traced from ground (+) through the lower winding of continuous tone transformer RC21, operated contacts 221, the upper winding of calling bridge relay 210, contacts **231*b* or capacitor C21, tip conductor T, subscriber station A, ring conductor R, contacts 232*b* or capacitor C22, and the lower winding of calling bridge relay 210 to (−) battery. Normally tone is transmitted via capacitors C21 and C22. The effect of shunting contacts 231*b* and 232*b* at this stage is merely a fortuitous event which does not change my test equipment. Test start relay 220 also operates step relay 320 over the circuit which may be traced from ground (+) through operated contacts 223 and the winding of step relay 320 to (−) battery. The name "step" indicates that this relay causes test equipment 109 to step from one test to the next as line 111 is successively tested for various faults. Also responsive to the operation of test start relay 220, a circuit is completed for operating two-step, test hold relay 230 to its first or "X" step over the circuit that may be traced from ground (+) applied through operated contacts 223, normally closed contacts 238 and the lower winding of test hold relay 230** to (−) battery.

Test hold relay 230 is adapted to close only its "X" or preliminary contacts 236 and 237 when operated to its first step. Contacts 237 prepare a shunt circuit, the removal of which causes test hold relay 230 to operate to its sectond step later during the call, as explained below. Also responsive to the operation of test hold relay 230 to its first step, contacts 236 close thereby extending master ground from contacts 242 to operate primary delay relay 310 over a circuit which may be traced from (−) battery through the winding of relay 310, contacts 441, 452, 463, 236 and 242 to ground (+). Primary delay relay 310 has no function at this time.

When step relay 320 operates, as explained above, it closes contacts 327 thereby operating tone relay 330 over the circuit extending from (−) battery through the winding of relay 330, contacts 413 and 327 to ground (+). Capacitor C24 charges over an obvious circuit after contacts 327 close. The remaining contacts of step relay 320 have no effect at this time.

Tone relay 330 closes contacts 334 thereby completing a shunt circuit around the upper winding of test hold relay 230 which may be traced from ground (+) through contacts 223, 238, the upper winding of relay 230, contacts 237, 334, 236 and 242 to ground (+). As long as the shunt circuit is completed, test hold relay 230 remains operated on its first step. Also responsive to the operation of relay 330, contacts 335 close thereby preparing a locking circuit for relay 410 which may be traced from (−) battery through the winding of relay 410, contacts 412 (now open), 335, 236 and 242 to ground (+). The remaining contacts on tone relay 330 have no effect at this time.

The circuit is now ready for the first test to begin as is indicated to the subscriber at station A by the transmission of tone as described above. At this time relays 210, 220, 240, 310, 320, 330 and 420 are operated. Relay 230 is operated to its first step.

*Test initiated.*—Means is provided for initiating a test cycle when a person at station A hears and responds to the tone described above by transmitting a distinctive pulse as by operating his hookswitch to open the loop across conductors T and R for a period of time which extends over approximately 250 milliseconds, for example. At the end of that period, subscriber A releases his hookswitch to recomplete the loop across conductors T and R. It is important to remember the various time periods that are effective throughout the operation of test equipment 109, since many of the relays are designed to remain in an operated condition for a given time period after their original circuits are broken. Many functions must occur during the periods required for these relays to release and further many other circuit operations do no occur unless these functions fail to occur within these periods. As pointed out above, the specific figures, such as 250 milliseconds, is by way of example only—it is the function which is important.

Responsive to the 250 millisecond period during which the loop across conductors T and R is broken, calling bridge relay 210 restores to open contacts 214 thereby releasing test start relay 220. Contacts 212 also open; however, the slow release characteristics of relays 220 and 240 are such that only test start relay 220 restores within the 250 millisecond period while release delay relay 240 continues to hold and is re-energized at the end of the 250 millisecond period. When test start relay 220 releases, contacts 221 open to break the circuit extending from the lower winding of continuous tone coil RC21 through contacts 221, the upper winding of calling bridge relay 210, capacitor C21, conductor T, station A, conductor R, capacitor C22 and the lower winding of calling bridge relay 210 to (−) battery, thereby terminating the tone that is used to indicate the start of the test. Contacts 223 open to initiate the test by performing several functions. First, test hold relay 230 is operated to its second step because the shunt around the upper winding is removed. The circuit for operating relay 230 to its second step now extends from (−) battery through the lower and upper windings of test hold relay 230 connected in series, "X" or preliminary contacts 237, contacts 334, 236 and 242 to ground (+). Capacitor C23 is charged over the circuit just traced through contacts 237. Second, contacts 223 open the circuit over which step relay 320 was operated; however, that relay continues to hold due to the discharging current extended from capacitor C25, as explained below.

When test hold relay 230 operates to its second step, contacts **231*b* and 232*b* open to disconnect calling bridge relay 210 from talking conductors T and R. Contacts 235 close to complete an obvious circuit for holding release delay relay 240 in an operated condition. Contacts 238 open so that the upper winding of test hold relay 230 may not be shunted again for the duration of the call. During the interval between the time when calling bridge relay 210 restores responsive to the 250 millisecond open loop pulse and the time when test hold relay 230 operates, a circuit is completed from ground (+) through contacts 239, 215, 313, 456, 465, 443, and the winding of pulse A relay 440 to (−) battery. Test hold relay 230 opens this circuit when it operates contacts 239 on its second step. The remaining contacts on test hold relay 230** relate to the leakage test and are explained in greater detail in the following section relating to that subject.

Pulse A relay 440 has no function at this time. It is explained in detail later in the section entitled "Limits Test." Briefly, pulse A relay 440 operates its contacts 441 to release primary delay relay 310 which, in turn, opens contacts 313 to prevent further operation of pulse relays 440—460.

*Leakage test.*—Means is provided to make a test at this time to determine whether there is a leakage fault that interconnects conductors T and R. For example, a fault of this type is illustrated by the resistor shown in Fig. 1 by dotted lines and marked "IF." It may or may not be present. This test is made during the 250 millisecond period while the loop between conductors T and R is broken by the hookswitch at station A.

In greater detail, when test hold relay 230 operates to its second step, contacts **231*a* and 232*a* close to connect conductors T and R to line test relay 420 over the circuit extending from ground (+) through contacts 342, 321, 231*a*, conductor T, the insulation fault IF (if any, the loop being then open at the hookswitch of station A), conductor R, contacts 232*a*, 324, potentiometer R31, contacts 351*a*, the winding of line test relay 420 and contacts 352*a* to (−) battery. Note that the original circuit to line test relay 420 is now open at contacts 233*b*; therefore, if line test relay 420 is to remain operated at all it must do so over the circuit extending through insulation fault IF, the hookswitch at station A being then open. Also, contacts 233*b* are arranged to open only after contacts 231*a* and 232*a* have closed. Potentiometer R31 may be adjusted so that line test relay 420 remains operated only if the fault exceeds certain predetermined limits which may vary according to the circuit operations explained in the section entitled "Limits Test." That is, the original circuit to step relay 320 was broken by test start relay 220 when it opened contacts 223, as explained above; however, relay 320 does not release at once since capacitor C25 begins to discharge through contacts 245 and the winding of relay 320 to (−) battery. The circuit values are such that the leakage test is completed before capacitor C25 is discharged and before step relay 320 is released. Hence, the outcome of the test is determined by whether line test relay 420 releases before or after step relay 320. It is assumed that there is no leakage fault and that line test relay 420 releases immediately after contacts 233*b* open and before step relay 320** releases. The explanation of the circuit operation when a fault is indicated is set forth below in the section entitled "Faults."

Responsive to the release of line test relay 420, contacts 421 close for operating test assist relay 410 over the circuit which may be traced from (−) battery through the winding of relay 410, contacts 338, 328, 421, 236 and 242 to ground (+). Attention is directed to the fact that a test indicating no fault is made by the completion of this circuit to test assist relay 410 after contacts 421 close and before contacts 328 open.

Responsive to the operation of test assist relay 410, ground check relay 340 is operated to its first step over a circuit that may be traced from (−) battery through the upper winding of ground check relay 340, contacts 343, 326, 411, 412, 335, 236 and 242 to ground (+). Contacts 412 also complete a locking circuit for test assist relay 410 which may be traced from (−) battery through the winding of relay 410, and contacts 412, 335, 236 and 242 to ground (+). On this step, ground check relay 340 operates only its "X" or preliminary contacts 345, thereby completing a circuit for shunting its lower winding over the path extending from ground (+) through contacts 242, 236, 345, the lower winding of relay 340, contacts 343, 326, 411, 412, 335, 236 and 242 to ground (+). Contacts 413 open to break the circuit over which tone relay 330 originally operated; however, it does not release at this time because contacts 336 are now closed. Contacts 414 close to prepare a circuit for step relay 320 which, however, is not completed at this time because contacts 337 are standing open.

Finally, after a period of time which may approximate 500 milliseconds, capacitor C25 is fully discharged and step relay 320 is released. Responsive thereto, contacts 328 open to break the circuit over which test assist relay 410 operated while contacts 321 and 324 open to break the circuit over which the leakage test was just made. If there had been a leakage fault IF, line test relay 420 would release at this time; however, test assist relay 410 would not operate because contacts 421 would not have closed until after contacts 328 had opened. Contacts 323 close to extend tone as an indication that the leakage test is completed, the circuit extending from ground (+) through the lower winding of repeat coil RC21, contacts 331, 323, 222, the upper winding of calling bridge relay 210, capacitor C21, conductor T, the receiver at station A, conductor R, capacitor C22, and the lower winding of calling bridge relay 210 to (−) battery. Contacts 325 have no function at this time. Ground check relay 340 operates to its second step when contacts 326 open to break the shunt around the lower winding of relay 340. The circuit for operating relay 340 to its second step extends from (−) battery through the upper and lower windings of ground check relay 340 connected in series, contacts 345, 236 and 242 to ground (+). Contacts 327 open to break the circuit over which tone relay 330 is locked operated; however, it continues to be held by the discharging current extended from capacitor C24 through contacts 244, 336 and the winding of relay 330 to (−) battery.

Another brief time period, approximating 500 milliseconds, expires during which time capacitor C24 discharges and then tone relay 330 releases. The tone that indicates completion of the leakage test is removed when contacts 331 open. Contacts 333 have no function at this time. The discharging current resulting from the charge on capacitor C23 energizes test hold relay 230 after contacts 334 open. If there is no fault, contacts 334 reclose before relay 230 can release. Also responsive to the release of tone relay 330, contacts 335 open; however, slow release test assist relay 410 requires some time before it returns to normal. Contacts 337 close to complete a circuit for operating step relay 320 during the slow release time interval of test assist relay 410, the circuit being from (−) battery through the winding of step relay 320, contacts 337, 371, 414, 236 and 242 to ground (+).

Responsive to the operation of step relay 320, "X" or preliminary contacts 325 close first to operate line test relay 420 over the circuit extending from (−) battery through contacts 352*a*, the winding of line test relay 420, rest contacts 351*a*, contacts 333, "X" or preliminary contacts 325 and contacts 353*a* to ground (+). Also responsive to the operation of step relay 320, contacts 321 and 324 close to prepare for a ground test, to be explained below. Contacts 326 close but have no effect at this time because even though contacts 411 may not be opened as yet, contacts 335 and 338 are open. Capacitor C24 is recharged over an obvious circuit when contacts 327 close. Contacts 328 have no effect because tone relay 330 has not yet closed contacts 338.

The slow release time period of test relay 410 is not critical; however, it expires and relay 410 releases some time before the ground test is made. Responsive thereto, relay 410 closes contacts 413 thereby operating tone relay 330 over a circuit which may be traced from (−) battery through the winding of relay 330, contacts 413 and 327 to ground (+). Relay 330 locks at it contacts 336.

When tone relay 330 operates, as explained above, contacts 331 close to prepare for the transmission of tone later during the test cycle. Contacts 333 open to break the circuit over which line test relay 420 just operated. Line test relay 420 functions as described below in the section entitled "Ground Test." Test hold relay 230 is re-energized and capacitor C23 is recharged when contacts 334 close. Contacts 335 close to prepare for locking relay 410, while contacts 337 open to break the circuit over which step relay 320 has just operated. Once again, step relay 320 is held for a period of time due to the discharging current from capacitor C25.

*Ground test.*—Means is provided for testing to determine whether any foreign or fault ground potentials are connected to either of the conductors T or R. A ground fault of this nature is shown in Fig. 1 by dotted lines designated "GF." It should be obvious that this ground fault could occur at any point along the length of talking conductors T and R which extend to station A. Furthermore, this ground potential is present only if there is a fault—normally it is not present.

In greater detail, the ground test is made when tone relay 330 releases and ground check relay 340 operates to its second step, as explained above. To review briefly, at the end of the leakage test, line test relay 420 operated over the circuit extending from ground (+) through contacts 353*a*, 325, 333, 351*a*, the winding of line test relay 420, and contacts 352*a* to (−) battery. This circuit was broken when contacts 333 opened responsive to the operation of tone relay 330. If there is a ground fault, line test relay 420 is held over the circuit extending from (−) battery through contacts 352*a*, the winding of line test relay 420, contacts 351*a*, potentiometer R31 and in parallel over the conductors of the line. One branch of the parallel circuit may be traced from potentiometer R31 through contacts 341, 321, 231*a* and conductor T to the ground fault marked GF. The other branch of the parallel circuit may be traced from potentiometer R31 through contacts 324, 232*a*, conductor R, subscriber station A and conductor T to ground fault GF (the loop being then closed through the hookswitch due to the expiration of the 250 millisecond onhook pulse).

It is assumed that there is no fault and that line test relay 420 releases at once and before step relay 320 releases. Therefore, test assist relay 410 operates over a circuit which may be traced from (−) battery through the winding of relay 410, contacts 338, 328, 421, 236 and 242 to ground (+). Responsive thereto, contacts 411 close to operate two-step battery check relay 350 to its first step over the circuit extending from (−) battery through the upper winding of relay 350, contacts 354, 344, 326, 411, 412, 335, 236 and 242 to ground (+) Relay 410 is locked at its contacts 412. Contacts 414 close to prepare a circuit for operating step relay 320 at the start of the next test. Contacts 413 open to break the original operating circuit for relay 330.

Approximately 500 milliseconds after contacts 337 open responsive to the operation of tone relay 330, as explained above, capacitor C25 is discharged fully, thereby releasing step relay 320. Responsive thereto, contacts 321 and 324 open to break the test circuit. Tone is sent over the path extending from ground (+) through the lower winding of continuous tone coil RC21, contacts 331, 323, 222, the upper winding of calling bridge relay 210, capacitor C21, conductor T, subscriber station A, conductor R, capacitor C22, and the lower winding of calling bridge relay 210 to (−) battery. The transmission of this tone indicates that the test circuit has completed a ground test. Contacts 325 have no function at this time. Two-step battery check relay 350 operates to its second step when contacts 326 open to break the shunt circuit around the lower winding of relay 350. The operating circuit for relay 350 extends from (−) battery through the upper and lower windings of battery check relay 350, contacts 356, 236 and 242 to ground (+). Contacts 327 open to break the locking circuit to tone relay 330; however, as before, it remains operated for the discharge time of capacitor C24. Contacts 328 break the path over which test assist relay 410 operated at the successful completion of the ground test.

Responsive to the operation of battery check relay 350 to its second step, contacts 351*a* to 353*b*, inclusive, operate to prepare for a test to determine whether any foreign battery is connected to talking conductors T and R. Contacts 355 close to prepare a circuit for operating clear check relay 360 to its first step.

After capacitor C24 is discharged sufficiently, tone relay 330 releases to open contacts 331 and thereby terminate transmission of the tone that indicated the completion of a ground test. Contacts 335 have no function at this time. Again, test hold relay 230 is arranged not to release during the period while contacts 334 are normally open between successful tests. Contacts 335 open; however, slow release test assist relay 410 continues to hold for its delay time period. Contacts 337 close to reoperate step relay 320 and to recharge capacitor C25 during the slow release time of test assist relay 410, the circuit extending from (−) battery through the winding of step relay 320, contacts 337, 371, 414, 236 and 242 to ground (+). Capacitor C25 is charged over this circuit in parallel with step relay 320.

When step relay 320 operates, contacts 325 are the first to make thereby operating line test relay 420 over a circuit which may be traced from (−) battery through contacts 353*b*, 325, 333, 352*b*, the winding of line test relay 420, and contacts 351*b* to ground (+). Also responsive to the operation of step relay 320, contacts 321 and 324 close to complete a circuit over which the battery test is conducted, as explained below. Contacts 326 close; however, nothing happens at this time because contacts 335 and 338 are still open. Contacts 327 close to reoperate tone relay 330 over a circuit including contacts 413 and to recharge capacitor C24 over a circuit including contacts 244. Contacts 328 have no function at this time.

As pointed out above, the locking circuit for test assist relay 410 was broken when contacts 335 opened. There is a time period marked by the slow release characteristics of test assist relay 410 during which step relay 320 operates; then, relay 410 releases. Responsive thereto, contacts 413 close and tone relay 330 operates over the circuit extending from (—) battery through the winding of relay 330, contacts 413 and 327 to ground (+). Contacts 412 open to break the locking circuit for relay 410 while contacts 414 open to break the circuit over which step relay 320 operated. Thereafter, step relay 320 is held operated by discharging current from capacitor C25 while a test is made to determine whether any foreign batteries are connected to the line.

*Battery test.*—Means is provided for testing the line including conductors T and R to determine whether any foreign battery is connected thereto. Fig. 1 shows a foreign battery, which may or may not be present, by means of dotted lines designated "BF." It should be obvious that this foreign battery may be connected at any point along the loop including conductors T and R.

In greater detail, when tone relay 330 operates, as explained above, contacts 333 open to break the original circuit over which line test relay 420 operated. If a foreign battery is connected to lines T and R, a circuit may be traced from ground (+) through contacts 351*b*, the winding of line test relay 420, operated contacts 352*b*, potentiometer R31 and in parallel over the line conductors. One branch of this parallel circuit may be traced through contacts 341, 321, 231*a* and conductor T to foreign battery BF. The other branch of the parallel circuit may be traced from potentiometer R31 through contacts 324, 232*a*, conductor R, subscriber station A, and conductor R to battery fault BF. On the other hand, if there is no battery fault on the line, line test relay 420 releases immediately upon the operation of contacts 333. It is assumed that there is no fault, that line test relay 420 releases and that contacts 421 close to operate test assist relay 410 over the circuit which may be traced from (—) battery through the winding of relay 410, contacts 338, 328, 421, 236 and 242 to ground (+).

When test assist relay 410 operates, contacts 411 close thereby operating clear check relay 360 to its first step over the circuit which may be traced from (—) battery through the upper winding of clear check relay 360, contacts 361, 355, 344, 326, 411, 412, 335, 236 and 242 to ground (+). On its first step, clear check relay 360 closes only its "X" or preliminary contacts 362 thereby shunting its lower winding over the circuit which may be traced from ground (+) through contacts 242, 236, 362, the lower winding of clear check relay 360, contacts 361, 355, 344, 326, 411, 412, 335, 236 and 242 to ground (+). Returning to the operation of test assist relay 410, contacts 412 also lock relay 410. Contacts 414 close; however, contacts 337 are open at this time.

Step relay 320 continues to hold operated for a period approximating 500 milliseconds while capacitor C25 discharges, following which relay 320 restores. In doing so, it opens contacts 321 and 324 thereby breaking the circuit over which the battery test has just been made. Contacts 323 close thereby extending tone as an indication that the battery test has been completed. The tone circuit extends from ground (+) through the lower winding of continuous tone coil RC21, contacts 331, 323, 222, the upper winding of calling bridge relay 210, capacitor C21, conductor T, subscriber station A, conductor R, capacitor C22, and the lower winding of calling bridge relay 210 to (—) battery. Contacts 325 open but perform no function at this time. Contacts 326 open thereby breaking the shunt around the lower winding of clear check relay 360, thus allowing it to operate to its second step over the circuit that may be traced from (—) battery through the upper and lower windings of clear check relay 360 in series, operated contacts 362, 236 and 242 to ground (+). Contacts 327 open the circuit over which tone relay 330 operated; however, it continues to hold operated due to the discharging current from capacitor C24. Contacts 328 open the circuit over which test assist relay 410 was operated.

When clear check relay 360 operates to its second step, as explained above, it opens contacts 361 to keep its lower winding from being shunted when step relay 320 reoperates. Contacts 364 close; however, test end relay 370 does not operate since test assist relay 410 continues to hold contacts 415 open.

After capacitor C24 is completely discharged, contacts 331 open thereby terminating the transmission of tone. Contacts 333 have no effect at this time. Contacts 334 open to break the circuit through the upper winding of test hold relay 230 while contacts 335 open the locking circuit to test assist relay 410 which does not release at once because of its slow release characteristics. During this slow release period, a circuit is closed at contacts 337 to reoperate step relay 320 and recharge capacitor C25 over the circuit that extends in parallel from (—) battery through capacitor C25 and the winding of relay 320, contacts 337, 371, 414, 236 and 242 to ground (+).

After a period marked by its slow release characteristics, test assist relay 410 releases to close contacts 415 thereby operating test end relay 370 over the circuit extending from (—) battery through the winding of relay 370, contacts 364, 415, 236 and 242 to ground (+). Test end relay 370 closes its contacts 372 to lock itself to master ground via contacts 236 and 242. Contacts 371 open so that step relay 320 may not reoperate thereafter. Step relay 320 continues to be held by the discharging current from capacitor C25.

*Test ends.*—Step relay 320 has reoperated for the last time. The circuit repeats the routine described above in the section entitled "Battery Test." During this test, a fourth pulse is transmitted to indicate to the person at station A that there is no trouble on the line.

When tone relay 330 releases, as described in the section entitled "Battery Test," contacts 337 close; however, this time there is no circuit to reoperate step relay 320 during the slow release time of test assist relay 410 because contacts 371 are standing open.

After a period of time determined by its slow release characteristics, test assist relay 410 restores. Since neither step relay 320 nor tone relay 330 reoperate, contacts 334 stand open and an extended period of time passes while capacitor C23 discharges through contacts 243 and 237 and the upper and lower windings of test hold relay 230 to (—) battery. After capacitor C23 has discharged sufficiently, test hold relay 230 restores. Contacts 231*a* and 232*a* open to break the circuit over which tests were made while contacts 231*b* and 232*b* close to reconnect calling bridge relay 210 to conductors T and R. Contacts 235 open and 234 close; however, release delay relay 240 continues to be held due to its slow release characteristics until calling bridge relay 210 may reoperate thereby closing contacts 212. At that time the circuit for holding release delay relay 240 may be traced from (—) battery through the winding of relay 240, contacts 212 and 234 to ground (+). Contacts 236 return to normal thereby breaking the circuit from master ground to restore any relays in the testing circuits that may then be operated. Responsive to the closure of contacts 239, test start relay 220 reoperates and the entire testing cycle may be repeated, if desired.

*Faults*

Next, there is a description of the manner in which test equipment 109 operates if any fault is encountered. The circuit functions the same whether the fault is a leakage fault, a battery fault, or a ground fault. Therefore, it is assumed first that there is a leakage fault which is shown by a resistor drawn in dotted lines and designated "IF."

The circuit functions as described above until the fault is encountered. That is, calling bridge relay 210 operates when the calling subscriber initiates the call. Responsive thereto, the following relays operate: test start relay 220, release delay relay 240, primary delay relay 310, step relay 320, tone relay 330, line test relay 420, and pulse A relay 440, while two-step test hold relay 230 operates to its first step. Tone is returned to station A thereby indicating that the test may begin. Responsive to hearing this tone, the person at station A operates a hookswitch to transmit an open loop pulse of approximately 250 milliseconds duration, thereby restoring calling bridge relay 210 for a similar 250 millisecond period. All of the foregoing operations are described above in detail. This portion of the description begins with receipt of the 250 millisecond open loop pulse. Further, this portion of the description is abridged somewhat in that the only circuit features to be described are those which are necessary for an understanding of the manner in which the circuit operates when a fault is encountered.

Means is provided for making a leakage test responsive to receipt of the 250 millisecond pulse during which the loop across conductors T and R is broken. Calling bridge relay 210 restores during the open loop pulse to open contacts 214 thereby releasing test start relay 220. Responsive thereto, contacts 223 open, first, to break the shunt around the upper winding of test hold relay 230 thereby allowing it to operate to its second step over the circuit that may be traced from (—) battery through the lower and upper windings of test hold relay 230, contacts 237, 334, 236 and 242 to ground (+). Contacts 223 also break the original circuit over which step relay 320 was energized. However, capacitor C25 has been fully charged over the circuit including contacts 223 and 245; therefore, there is a discharge current through the winding of step relay 320 thus holding it operated for a period of approximately 500 milliseconds.

Previously, line test relay 420 has operated over the circuit which may be traced from (—) battery through contacts 352*a*, the winding of line test relay 420, resting contacts 351*a*, operated contacts 241 and resting contacts 233*b* to ground (+). When test hold relay 230 operates to its second step, contacts 233*b* open thereby breaking the circuit for originally operating line test relay 420. Also, when test hold relay 230 operates to its second step, contacts 231*a* and 232*a* close thereby conducting a leakage test which is by way of the circuit that may be traced from (—) battery through contacts 352*a*, the winding of line test relay 420, contacts 351*a*, potentiometer R31, operated contacts 324, 232*a*, ring conductor R, leakage fault IF (the hookswitch at station A being then open), tip conductor T, operated contacts 231*a* and 321, and resting contacts 342 to ground (+). Potentiometer R31 is adjusted so that line test relay 420 does not remain operated unless the leakage fault interconnecting tip and ring conductors T and R exceeds a certain magnitude. Since it is assumed that there is such a fault, line test relay 420 remains operated and does not release at this time. Contacts 421 remain open so that no circuit is completed for operating test assist relay 410. If the test had indicated that there was no fault, the circuit to relay 410 would have been traced from (—) battery through the winding of test assist relay 410, contacts 338, 328, 421 (if they were closed), 236 and 242 to ground (+).

After capacitor C25 has discharged sufficiently, step relay 320 releases thereby opening contacts 321 and 324 thus breaking the circuit over which line test relay 420 has been holding. Contacts 328 open thus breaking the circuit to test assist relay 410 before contacts 421 close; hence, test assist relay 410 does not operate.

Tone relay 330 has its circuit broken when step relay 320 opens contacts 327; however, tone relay 330 is held for the discharge time of capacitor C24. A pulse of tone is transmitted during this time interval to indicate the completion of a leakage test. The tone circuit is completed from the ground (+) through the lower winding of continuous tone coil RC21, operated contacts 331, rest contacts 323, 222, the upper winding of calling bridge relay 210, capacitor C21, conductor T, subscriber station A, ring conductor R, capacitor C22, and the lower winding of calling bridge relay 210 to (—) battery. There is an elapse of approximately 500 milliseconds while capacitor C24 is discharging, after which tone relay 330 restores and opens contacts 331 to terminate the tone that has been transmitted. Contacts 337 close thus completing a circuit which would be used to operate step relay 320 if the test had shown that there was no fault on the line. However, test assist relay 410 has not operated; hence, contacts 414 are open so that step relay 320 is not reoperated.

Test hold relay 230 has been holding over a circuit including contacts 334 which open when tone relay 330 restores. Thereupon, capacitor C23 begins to discharge through the windings of test hold relay 230 to hold that relay operated over the period which is normally required for step relay 320 and tone relay 330 to reoperate in the case of a test indicating no fault. Since step and tone relays 320 and 330 do not reoperate owing to the existence of a fault condition, contacts 334 remain open for a period which is longer than the discharge time of capacitor C23 thus causing test hold relay 230 to release. When relay 230 releases, contacts 231*a* and 232*a* open while contacts 231*b* and 232*b* close to reconnect calling bridge relay 210 to conductors T and R.

Responsive to the operation of relay 210, contacts 214 close and test start relay 220 reoperates over the circuit which may be traced from (—) battery through the winding of relay 220, contacts 214 and 239 to ground (+). Responsive to the operation of test start relay 220, contacts 221 close thus transmitting continuous tone over the circuit extending through the lower winding of continuous tone coil RC21, contacts 221, the upper winding of calling bridge relay 210, capacitor C21, conductor T, subscriber station A, ring conductor R, capacitor C22, and the lower winding of calling bridge relay 210 to (—) battery.

In résumé, during the test just described, the person at station A has heard (1) continuous tone indicating that the test may be started, (2) one pulse of tone transmitted during the period after the release of step relay 320 and before the release of tone relay 330, and (3) continuous tone following the reoperation of test start relay 220. The one pulse of tone indicated that a fault was found during the first or leakage test.

Other faults are indicated in a similar manner. For example, if there is a ground fault on the line, the circuit functions in the manner described above except that line test relay 420 is held by a ground fault and does not release during the second test so that step relay 320 may not be reoperated to initiate the third test. Two pulses of tone are transmitted; however, there is no third pulse of tone, thereby indicating that a fault was found during the second or ground test. In a similar manner the receipt of three pulses of tone indicates that a fault was found during the third or battery test.

*Limits test*

Means is provided to test, in the case of a leakage fault, to determine the seriousness of the fault. For example, ideally there would be a very large amount of resistance, such as 25,000 ohms, between conductors T and R. On occasions, the insulation may break down somewhat and this resistance may fall to an undesirable level, such 20,000 ohms, but still remain above a level of minimum tolerance. On still other occasions, the resistance may fall to a level, such as 15,000, ohms, which is below minimum tolerance. Normally, the circuit tests at the minimum level of tolerance; nevertheless, the person making the test may perform two additional tests to determine whether the insulation fault exceeds minimum tolerance or ideal tolerance. To make a first of these tests, the dial at station A is operated to send the digit "2" responsive to which test equipment 109 performs a test to determine whether the leakage fault is above the level of desirable tolerance. To make a second of these tests, the person at station A may dial the digit "3" to determine whether the leakage fault is above the ideal level of tolerance. These digits are dialed at a time when test equipment 109 is seized and tone is returned to station A as an indication that the test may begin. This is the period in the test cycle just prior to the period as described in the foregoing specification when a 250 millisecond open loop pulse was transmitted. At this time, the following relays are operated: calling bridge relay 210, test start relay 220, test hold relay 230 (to its first step), release delay relay 240, primary delay relay 310, step relay 320, tone relay 330, and line test relay 420.

The following description is limited to those features which are necessary for an understanding of the limits test. For a detailed analysis of the circuit operation, see the foregoing description.

To review briefly, primary delay relay 310 operates over the circuit which may be traced from (—) battery through the winding of primary delay relay 310, contacts 441, 452, 463, 236 and 242 to ground (+). Primary delay relay 310 closes contacts 313 thereby preparing for operation of pulse relays 440—460, contacts 215 being open at this time. Contacts 312 close to prepare a circuit for holding primary delay relay 310 in an operated condition throughout the receipt of digit pulses. Contacts 311 close for preparing a circuit to operate pulse transfer relay 430, as explained below.

The circuit has been seized and is now ready to receive digit pulses as is indicated by the tone being transmitted from the lower winding of coil RC21 through contacts 221, the upper winding of calling bridge relay 210, capacitor C21, conductor T, station A, conductor R, capacitor C22, and the lower winding of relay 210 to (—) battery. Upon hearing this tone the person at substation A may proceed to dial. Dialing is by means of open loop pulses. That is to say, a dial at station A has impulsing contacts which complete a loop across conductors T and R. This loop is broken a number of times depending upon the numerical value of the digit that is dialed. Calling bridge relay 210 is holding over this loop so that it releases each time that a digit pulse is received. Assuming first that the digit "2" is dialed, calling bridge relay 210 releases and reoperates twice.

The first time that calling bridge relay 210 releases to repeat a digit pulse, a circuit is completed from ground (+) on contacts 239, through contacts 215, 313, 456, 465, 443 and the winding of pulse A relay 440 to (—) battery. Relay 440 operates and opens contacts 441 thereby breaking the circuit over which pulse delay relay 310 originally operated. However, pulse delay relay 310 has already locked over the circuit which may be traced from (—) battery through the winding of relay 310, contacts 312, 211 (calling bridge relay 210 being released), and contacts 234 to ground (+). Returning to the operation of pulse A relay 440, contacts 443 open to break the circuit over which relay 440 has just operated. However, before these contacts open, contacts 442 close so that pulse A relay is held over the circuit which may be traced from (—) battery through the winding of pulse A relay 440, contacts 442, 454, the lower winding of pulse transfer relay 430, contacts 236 and 242 to ground (+). Also, pulse transfer relay 430 operates over the circuit just traced.

Pulse transfer relay 430 closes its contacts 432 thereby locking over the circuit which may be traced from (—) battery through the upper winding of relay 430, contacts 432, 311, 213 and 234 to ground (+). Contacts 433 close to prepare for the operation of relay 450 upon occurrence of the second digit pulse.

When the first digit pulse ends, calling bridge relay 210 reoperates and opens contacts 213; however, pulse transfer relay 430 continues to hold in series with pulse A relay, as explained above, and primary delay relay 310 holds owing to its slow release characteristics.

The second digit pulse is received and calling bridge relay 210 releases a second time. Responsive thereto, contacts 215 close to operate pulse B relay 450 over the circuit which may be traced from ground (+) through contacts 239, 215, 313, 433, 444, and the winding of pulse B relay 450 to (—) battery. Responsive thereto, contacts 454 open thus breaking the circuit of pulse A relay 440 which releases. Pulse transfer relay 430 continues to hold operated over the circuit extending from (—) battery through its upper winding, contacts 432, 311, 213 and 234 to ground (+). Pulse B relay 450 closes its contacts 453 thereby locking to master ground over a circuit that may be traced from (—) battery through the winding of pulse B relay 450, contacts 453, 463, 236 and 242 to ground (+). Contacts 455 close to prepare for operating pulse C relay 460. Contacts 456 open so that pulse A relay 440 may not be reoperated by a third digit pulse. Contacts 451 close thereby connecting potentiometer R41 across conductors T and R in parallel with insulation fault IF. Resistor R42 is shunted at contacts 462.

Since it is assumed that there were only two digit pulses in the digit pulse train, nothing further happens until calling bridge relay 210 reoperates. Responsive thereto, contacts 211 remain open for a period of time which is longer than the slow release time period of primary delay relay 310 thereby causing it to release. Except for the fact that pulse B relay 450 is locked operated, the circuit is in the condition that it is when the 250 millisecond open loop pulse is transmitted as described above in the section entitled "Test Initiated." Therefore, subscriber A may now operate his hook-switch for about 250 milliseconds thereby initiating the line testing procedure. The distinction between this and the previously described test is that this time the addition of a resistance in parallel with leakage fault IF causes line test relay 420 to indicate a fault at a much lower limit. For example, potentiometer R31 may be adjusted so that line test relay 420 does not remain operated in series with the line when pulse B relay 450 is operated unless leakage fault IF is less than 20,000 ohms. On the other hand, when pulse B relay 450 is not operated so that there is no resistance connected in parallel with leakage fault IF, line test relay 420 may release when the fault is 15,000 ohms or less.

Next, it is assumed that someone at station A dials the digit "3" before beginning the test. This time the test indicates whether the leakage fault is less than desirable but above minimum tolerances. In this case, the first two digit pulses operate relays 440 and 450, as explained above. Pulse transfer relay 430 releases when contacts 213 open responsive to the operation of calling bridge relay 210 between the second and third digit pulses. At the start of the third digit pulse, calling bridge relay 210 releases to close contacts 215 whereupon a ground pulse is extended over a circuit which may be traced from ground (+) through contacts 239, 215, 313, 434, 455, and the winding of pulse C relay 460 to (—) battery. Relay 460 opens contacts 463 thereby releasing pulse B relay 450. Contacts 464 close and pulse C relay 460 locks over the circuit that may be traced from (−) battery through the winding of pulse C relay 460, contacts 464, the lower winding of pulse transfer relay 430, contacts 236 and 242 to ground (+). Contacts 465 open so that pulse A relay 440 may not reoperate thereafter. Contacts 463 open a point in the circuit extending to the primary delay relay 310. Contacts 461 close and 462 open thereby placing both of the resistors R41 and R42 across conductors T and R in parallel with leakage fault IF. The only difference between the present operation and that described above as responsive to the digit "2" is that this time a relatively large resistance is connected in parallel with leakage fault IF so that line test relay 420 may release responsive to a different level of fault resistance.

While I have shown and described a specific embodiment of my invention, other modifications will readily occur to those skilled in the art. I do not, therefore, want my invention to be limited to the specific arrangement shown and described, and I intend in the appended claims to cover all modifications that fall within the true spirit and scope of my invention.

What I claim is:

1. In a telephone system, subscriber lines, test means, switching means, means associated with each of said subscriber lines for transmitting digit pulses having predetermined characteristics to cause said switching means to interconnect one of said subscriber lines and said testing means, means in said testing means for indicating over said one subscriber line that a test may start, means associated with said one subscriber line for transmitting a distinctive pulse over said one subscriber line to said testing means, said distinctive pulse having characteristics that are different from said predetermined characteristics, and means in said testing means for responding to said distinctive pulse to test said one subscriber line.

2. In a telephone system, subscriber lines each serving at least one telephone station, testing means, switching means, means associated with each of said telephone stations for transmitting digit pulses each of which exists for a given time period to cause said switching means to interconnect one of said subscriber lines and said testing means, means in said testing means for indicating over said one subscriber line that a test may start, means associated with the telephone station served by said one subscriber line for transmitting over said one subscriber line a long pulse which exists for a long period of time as compared to said given time period, means in said testing means for responding to said long pulse to initiate a testing operation, and means in said test means for indicating over said one subscriber line the outcome of said testing operation.

3. In a telephone system, subscriber lines each serving at least one telephone station, each of said telephone stations being provided with a telephone dial and hookswitch contacts, testing means, switching means, means including said telephone dials for transmitting digit pulses to cause said switching means to interconnect one of said subscriber lines and said testing means, means in said testing means for indicating over said one subscriber line that a test may start, means responsive to operation of said hookswitch contacts for transmitting a distinctive pulse over said one subscriber line to said testing means, means in said testing means for responding to said distinctive pulse to initiate a testing operation, and means in said testing means for indicating over said one subscriber line the outcome of said testing operation.

4. In a telephone system, subscriber lines each serving at least one telephone station, each of said telephone stations being provided with a telephone dial and hookswitch contacts, testing means, switching means, means including said telephone dials for transmitting digit pulses to cause said switching means to interconnect one of said subscriber lines and said testing means, means in said testing means for indicating over said one subscriber line that a test may start, means including said hookswitch contacts for transmitting a distinctive pulse which is longer than a standard dial pulse but shorter than a release indication over said one subscriber line to said testing means, means in said testing means for responding to said distinctive pulse to initiate a testing operation, and means in said testing means for indicating over said one subscriber line the outcome of said testing operation.

5. In a telephone system, subscriber lines each serving at least one telephone station, each of said telephone stations being provided with a telephone dial and hookswitch contacts, testing means, switching means, means including said telephone dials for transmitting over said subscriber line digit pulses each existing for a given time period to cause said switching means to interconnect one of said subscriber lines and said testing means, means including said hookswitch contacts for transmitting over said subscriber line a long pulse which exists for a long period of time when compared to said given time period, means in said testing means for responding to said long pulse to initiate a testing operation, and means in said testing means for transmitting tone signals over said one subscriber line to indicate the outcome of said testing operation.

6. In a telephone system, subscriber lines, each of said subscriber lines serving at least one telephone station provided with a telephone dial and hookswitch contacts, testing means, switching means, means including said telephone dials for transmitting digit pulses to cause said switching means to interconnect one of said subscriber lines and said testing means, means in said testing means for indicating that a test may start, means including said telephone dials for thereafter transmitting additional digit pulses to said testing means for causing said testing means to select limits within which tests may be performed, means responsive to operation of said hookswitch contacts for transmitting a distinctive pulse over said one subscriber line to said testing means, and means in said testing means responsive to said distinctive pulse for initiating a testing operation within said selected limits.

7. In a telephone system, subscriber lines, test means, switching means, means associated with each of said subscriber lines for transmitting digit pulses having predetermined characteristics to cause said switching means to interconnect one of said subscriber lines and said testing means, means in said testing means for indicating that a test may start, means associated with said one subscriber line for transmitting a distinctive pulse, said distinctive pulse having characteristics that are different from said predetermined characteristics over said one subscriber line to said testing means, and means in said testing means for responding to said distinctive pulse to test said one subscriber line for insulation faults.

8. In a telephone system, subscriber lines each serving at least one telephone station, testing means, switching means, means associated with each of said telephone stations for transmitting digit pulses each of which exists for a given time period to cause said switching means to interconnect one of said subscriber lines and said testing means, means in said testing means for indicating that a test may start, means associated with the telephone station served by said one subscriber line for transmitting over said one subscriber line a long pulse which exists for a long period of time as compared to said given time period, means in said testing means for responding to said long pulse to test said one subscriber line for leakage, foreign battery potentials and foreign ground potentials, and means in said testing means for transmitting tone pulses over said one subscriber line to indicate the outcome of said tests.

9. In a telephone system, subscriber lines each serving at least one telephone station, each of said telephone stations being provided with a telephone dial and hookswitch contacts, testing means, switching means, means including said telephone dials for transmitting digit pulses to cause said switching means to interconnect one of said subscriber lines and said testing means, a line relay, means for extending ground and battery potentials through said line relay to said one subscriber line responsive to said interconnection, means in said testing means for indicating that a test may start, means including said hookswitch contacts for transmitting a distinctive pulse over said one subscriber line to said testing means, and means in said testing means for responding to said distinctive pulse to disconnect said potentials from and to connect leakage testing means to said one subscriber line.

10. The telephone system of claim 9 wherein said distinctive pulse comprises an open loop pulse and wherein said leakage testing means comprises means for connecting the conductors of said one subscriber line in series during said open loop whereby there is an electrical discontinuity between said conductors unless there is a leakage fault that interconnects said conductors.

References Cited in the file of this patent

UNITED STATES PATENTS 1,653,782 Riggs ---------------- Dec. 27, 1927